US009215687B2

(12) United States Patent
Hu

(10) Patent No.: US 9,215,687 B2
(45) Date of Patent: Dec. 15, 2015

(54) METHOD OF LOCATION INFORMATION PROCESSING AND ACCESS NETWORK DEVICE

(71) Applicant: Huawei Technologies Co., Ltd., Shenzhen, Guangdong (CN)

(72) Inventor: Guojie Hu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 225 days.

(21) Appl. No.: 14/026,700

(22) Filed: Sep. 13, 2013

(65) Prior Publication Data

US 2014/0011521 A1 Jan. 9, 2014

Related U.S. Application Data

(63) Continuation of application No. PCT/CN2012/071869, filed on Mar. 2, 2012.

(30) Foreign Application Priority Data

Mar. 17, 2011 (CN) .......................... 2011 1 0065243

(51) Int. Cl.
*H04W 24/00* (2009.01)
*H04W 64/00* (2009.01)
(Continued)

(52) U.S. Cl.
CPC ............ *H04W 64/003* (2013.01); *H04W 4/021* (2013.01); *H04W 4/20* (2013.01); *H04W 12/08* (2013.01); *H04W 48/04* (2013.01); *H04W 64/00* (2013.01); *H04W 84/045* (2013.01)

(58) Field of Classification Search
CPC ..... H04W 4/021; H04W 12/08; H04W 64/00; H04W 4/20; H04L 63/10; H04L 63/0492
USPC ...................... 455/411, 433, 436, 432.1, 130; 370/331, 401, 252, 338, 254, 352
See application file for complete search history.

(56) References Cited

U.S. PATENT DOCUMENTS 7,328,014 B2 * 2/2008 Takeda et al. ............... 455/435.1
8,805,370 B1 * 8/2014 Kannan et al. ................ 455/436
(Continued)

FOREIGN PATENT DOCUMENTS

CN 101262495 A 9/2008
CN 101572719 A 11/2009
(Continued)

OTHER PUBLICATIONS

International Search Report in corresponding PCT Patent Application No. PCT/CN2012/071869 (May 31, 2012).
(Continued)

*Primary Examiner* — Joseph Arevalo
(74) *Attorney, Agent, or Firm* — Leydig, Voit & Mayer, Ltd.

(57) ABSTRACT

Embodiments of the present disclosure provide a method of location information processing and an access network device, the method comprises: when a UE accesses a home network, the access network device acquires identification information and location information of the UE (101); and the access network device sends the identification information and the location information of the UE to a service server (102), such that the service server sends a service message to the UE according to the identification information and the location information of the UE. Embodiments of the present disclosure can avoid the problem that the service server cannot trigger a corresponding service message according to the location information of the UE since the HNB rejects the access of the UEs which are not in an admission list when operating in a close mode, thus improving flexibility and efficiency of a service message transmission.

11 Claims, 2 Drawing Sheets

(51) Int. Cl.
*H04W 4/02* (2009.01)
*H04W 12/08* (2009.01)
*H04W 84/04* (2009.01)
*H04W 48/04* (2009.01)
*H04W 4/20* (2009.01)

(56) References Cited

U.S. PATENT DOCUMENTS

| | | | |
|---|---|---|---|
| 2003/0005056 | A1 | 1/2003 | Yamamoto et al. |
| 2004/0179539 | A1* | 9/2004 | Takeda et al. .................. 370/401 |
| 2009/0093247 | A1* | 4/2009 | Srinivasan .................... 455/433 |
| 2009/0093248 | A1* | 4/2009 | Srinivasan .................... 455/433 |
| 2009/0100147 | A1* | 4/2009 | Igarashi ........................ 709/218 |
| 2009/0286510 | A1 | 11/2009 | Huber et al. |
| 2010/0040021 | A1* | 2/2010 | Aso et al. ...................... 370/331 |
| 2010/0235429 | A1* | 9/2010 | Simonen et al. .............. 709/203 |
| 2011/0021212 | A1 | 1/2011 | Chen et al. |
| 2012/0106370 | A1* | 5/2012 | Radulescu et al. ............ 370/252 |
| 2013/0012166 | A1* | 1/2013 | Li et al. ......................... 455/411 |

FOREIGN PATENT DOCUMENTS

| | | |
|---|---|---|
| CN | 101730079 A | 6/2010 |
| CN | 101784133 A | 7/2010 |
| CN | 102118686 A | 7/2011 |
| EP | 2194739 A1 | 6/2010 |

OTHER PUBLICATIONS

Writtem Opinion of the International Searching Authority in corresponding PCT Patent Application No. PCT/CN2012/071869 (May 31, 2012).

Chen et al., "Enabling location-based services in wireless LAN hotspots," International Journal of Network Management, vol. 15, pp. 163-175, John Wiley & Sons, Ltd., Hoboken, New Jersey (Feb. 28, 2005).

* cited by examiner

METHOD OF LOCATION INFORMATION PROCESSING AND ACCESS NETWORK DEVICE

CROSS-REFERENCE TO RELATED APPLICATIONS

This application is a continuation of International Patent Application No. PCT/CN2012/071869, filed on Mar. 2, 2012, which claims priority to Chinese Patent Application No. 201110065243.X, filed on Mar. 17, 2011, both of which are hereby incorporated by reference in their entireties.

FIELD OF THE TECHNOLOGY

Embodiments of the present disclosure relate to the communication technologies, in particular to a method of location information processing and an access network device.

BACKGROUND

A femto cell (Femto cell), also named a home NodeB (Home NodeB, HNB), can connect a user equipment (User Equipment, UE) to a core network, such that the UE performs a circuit switching (Circuit Switching, CS) field service or a packet switching (Packet Switching, PS) field service. The network which is composed of the HNB is called a home network. In a framework of HNB networking (i.e. the home network), when a UE triggers a location updating procedure in a cell (periodically or due to a location variation), a mobile switching center (Mobile Switching Center, MSC) can send a location information of the UE, such as a cell ID (Cell ID) of the cell where the UE is located, to a service server, and the service server triggers a corresponding service message according to the location information of the UE.

However, if the HNB is operating in a close (Close) mode, a home NodeB gateway (Home NodeB Gateway, HNB GW) can reject an access of the UE which is not in an admission list, such that the MSC cannot acquire the location information of the UE, thus resulting in that the service server cannot trigger the corresponding service message according to the location information of the UE, and flexibility and efficiency of a service message transmission are decreased.

SUMMARY

Embodiments of the present disclosure provide a method of location information processing and an access network device so as to increase flexibility and efficiency of a service message transmission.

An embodiment of the present disclosure provides a method of location information processing, comprising:

acquiring, by an access network device, identification information and location information of a UE when the UE accesses a home network; and sending, by the access network device, the identification information and the location information of the UE to a service server, such that the service server sends a service message to the UE according to the identification information and the location information of the UE.

An embodiment of the present disclosure further provides an access network device, comprising:

an acquiring module, configured to acquire identification information and location information of a UE when the UE accesses a home network; and a sending module, configured to send the identification information and the location information of the UE to the service server, such that the service server sends the service message to the UE according to the identification information and the location information of the UE.

It can be seen from the above technical solutions that, in embodiments of the present disclosure, when a UE accesses a home network, an access network device acquires the identification information and the location information of the UE, such that the access network device can send the identification information and the location information of the UE to a service server, thus the service server can send a service message to the UE according to the identification information and the location information of the UE. The service server in the embodiment of the present disclosure can acquire the location information of the UE without depending on a MSC, and it can avoid the problem that the service server cannot trigger a corresponding service message according to the location information of the UE since the HNB rejects the UEs which are not in an admission list when operating in a close mode, thus improving flexibility and efficiency of service message transmission.

BRIEF DESCRIPTION OF THE DRAWINGS

To illustrate the technical solutions according to embodiments of the present disclosure or in the prior art more clearly, the accompanying drawings required for describing embodiments or the prior art are introduced below briefly. Apparently, the accompanying drawings in the following descriptions are only some embodiments of the present disclosure, and persons of ordinary skill in the art can obtain other drawings according to the accompanying drawings without paying creative efforts.

DETAILED DESCRIPTION

In order to make the purposes, technical solutions and advantages of embodiments of the present disclosure more apparent, the technical solutions of the embodiments of the present disclosure will be described more clearly and completely in combination with the drawings of the embodiments of the present disclosure. Obviously, the embodiments described here are a part of the embodiments of the present disclosure but not all of the embodiments. Based on embodiments of the present disclosure, all of other embodiments obtained by those skilled in the art without creative work are within the protection scope of the present disclosure.

Figure 1:
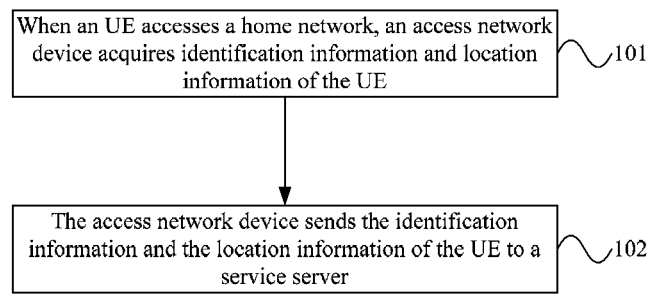
FIG. 1 is a schematic flow diagram of a method of location information processing provided by Embodiment 1 of the present disclosure.

FIG. 1 is a schematic flow diagram of a method of location information processing provided by Embodiment 1 of the present disclosure, as shown in FIG. 1, the method of location information processing can include the following steps:

Step 101, when a UE accesses a home network, an access network device acquires identification information and location information of the UE;

wherein, the identification information of the UE can include but is not limited to an international mobile subscriber identifier (International Mobile Subscriber Identifier, IMSI) or a closed subscriber group (Closed Subscriber Group, CSG), which the UE belongs to, identification (CSG ID).

Wherein, the location information of the UE can include but is not limited to a cell identifier (CELL ID) of a cell in which the UE is located, a home nodeB identifier (HNB ID) of an HNB which the UE accesses into or geographic information of the HNB which the UE accesses into. Wherein, the geographic information of the HNB can include but is not limited to longitude and latitude information configured by an operator or the UE for each HNB, internet information (Internet Information) of the HNB, such as IP address, media access control (Media Access Control, MAC) address, etc.

Step 102, the access network device sends the identification information and the location information of the UE to a service server, such that the service server sends a service message to the UE according to the identification information and the location information of the UE.

Alternatively, the access network device in the present step can send the identification information and the location information of the UE to the service server corresponding to the UE directly according to a corresponding relationship between the UE and a service. Wherein, the corresponding relationship between the UE and the service can comprise at least one of the following corresponding relationships: a corresponding relationship between the identification information of the UE and the service; a corresponding relationship between the location information of the UE and the service, as shown in Table 1:

TABLE 1

Corresponding relationship between the UE and the service

| UE | Service |
| --- | --- |
| Identification information and/or location information of UE1 | advertising service, attendance service, children home-coming service |
| Identification information and/or location information of UE2 | advertising service |
| Identification information and/or location information of UE3 | attendance service, |
| Identification information and/or location information of UE4 | advertising service, children home-coming service |
| ... | ... |

Alternatively, the access network device can further send, according to time information corresponding to time at which the identification information and the location information of the UE are acquired, the identification information and the location information of the UE to a service server of a service corresponding to the UE and the time information. That is, the access network device can send the identification information and the location information of the UE to the service server corresponding to the time information and the UE according to a corresponding relationship between the UE and the service and a corresponding relationship between the time information and the service. Wherein, the corresponding relationship between the time information and the service can be configured to indicate a time (time point or time range) at which a service can be provided, and it can be as shown in Table 2:

TABLE 2

Corresponding relationship between the time information and the service

| Time information | Service |
| --- | --- |
| time information 1 | advertising service, attendance service, children home-coming service |
| time information 2 | advertising service |
| time information 3 | attendance service |
| time information 4 | advertising service, children home-coming service |
| ... | ... |

Alternatively, in the present step, the access network device can send the identification information and the location information of the UE to the service server through a location service gateway of the HNB. Correspondingly, the location service gateway of the HNB can send the identification information and the location information of the UE to the service server of the service corresponding to the UE according to the corresponding relationship between the UE and the service. Wherein, the corresponding relationship between the UE and the service can comprise at least one of the following corresponding relationships: a corresponding relationship between the identification information of the UE and the service; a corresponding relationship between the location information of the UE and the service, and this can be as shown in Table 1. Alternatively, the location service gateway of the HNB can further send, according to time information corresponding to time at which the identification information and the location information of the UE are acquired, the identification information and the location information of the UE to a service server of a service corresponding to the UE and the time information. That is, the location service gateway of the HNB can send the identification information and the location information of the UE to the service server of the service corresponding to the time information and the UE according to the corresponding relationship between the UE and the service (as shown in Table 1) and the corresponding relationship between the time information and the service (as shown in Table 2).

It should be noted that: in the present embodiment, the access network device can be an HNB, or can also be an HNB gateway, and this will not be limited in the present embodiment.

In the embodiment, when a UE accesses a home network, the identification information and the location information of the UE are acquired through an access network device, such that the access network device can send the identification information and the location information of the UE to a service server, thus the service server can send a service message to the UE according to the acquired identification information of the UE and the location information of the UE. The service server in the present embodiment can acquire the location information of the UE without depending on an MSC, and it can avoid the problem that the service server cannot trigger a corresponding service message according to the location information of the UE since the HNB rejects the access of the UEs which are not in an admission list when operating in a close mode, thus improving flexibility and efficiency of a service message transmission.

Figure 2:
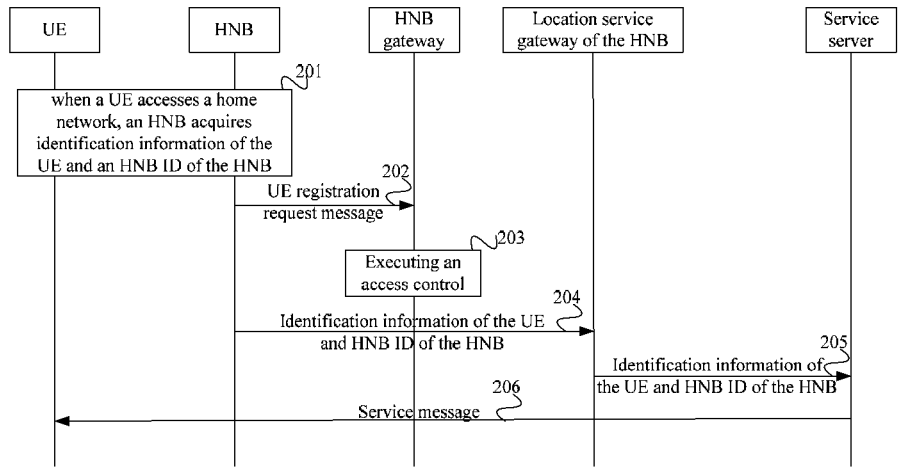
FIG. 2 is a schematic flow diagram of a method of location information processing provided by Embodiment 2 of the present disclosure.

FIG. 2 is a schematic flow diagram of a method of location information processing provided by Embodiment 2 of the present disclosure, the present embodiment is a specific embodiment of Embodiment 1, as shown in FIG. 2, and the method of location information processing of the present embodiment can include the following steps:

Step 201, when a UE accesses a home network, an HNB acquires identification information of the UE and an HNB identification (HNB ID) of the HNB;

wherein, the HNB may operate in an open (Open) mode, or may be in a close (Close) mode.

Step 202, the HNB sends a UE registration request (US Registration Req) message to an HNB gateway, where the UE registration request includes the identification information of the UE, version information of the UE and capability information of the UE;

Step 203, the HNB gateway executes an access control;

Specifically, the HNB gateway can execute the access control according to a rejected admission list stored therein, for example: a UE which is in the rejected admission list is permitted to access to a core network, and the following procedure is executed; and a UE which is not in the rejected admission list is permitted to access the core network.

Step 204, the HNB sends the identification information of the UE and the HNB identification (HNB ID) of the HNB to a location service gateway of the HNB;

Step 205, the location service gateway of the HNB sends, according to a corresponding relationship between the UE and a service, the identification information of the UE and the HNB identification (HNB ID) of the HNB to a service server of the service corresponding to the UE;

Wherein, the corresponding relationship between the UE and the service can include at least one of the following corresponding relationships: a corresponding relationship between the identification information of the UE and the service; a corresponding relationship between the HNB identification (HNB ID) of the HNB and the service.

Step 206, the service server sends a service message to the UE according to the acquired identification information of the UE and the HNB identification (HNB ID) of the HNB.

It should be noted that, there is no execution order between the above steps 202, 203 and steps 204, 205, 206.

In the present embodiment, when a UE accesses a home network, an HNB acquires the identification information of the UE and the HNB identification (HNB ID) of the HNB, such that the HNB can send the identification information of the UE and the HNB identification (HNB ID) of the HNB to a service server through a location service gateway of the HNB, thus the service server can send a service message to the UE according to the acquired identification information of the UE and the HNB identification (HNB ID) of the HNB. The service server in the present embodiment can acquire the location information of the UE without depending on an MSC, and it can avoid the problem that the service server cannot trigger a corresponding service message according to the location information of the UE since the HNB rejects the access of the UEs which are not in an admission list when operating in a close mode, thus improving flexibility and efficiency of a service message transmission.

Figure 3:
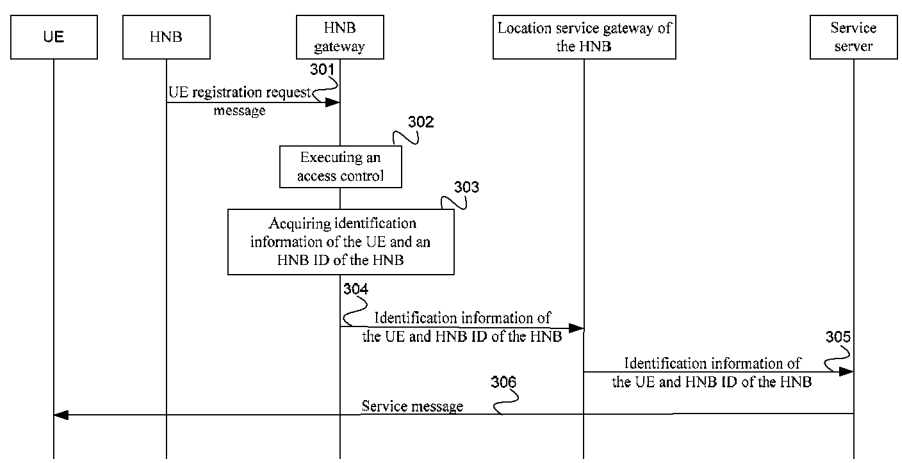
FIG. 3 is a schematic flow diagram of a method of location information processing provided by Embodiment 3 of the present disclosure.

FIG. 3 is a schematic flow diagram of a method of location information processing provided by Embodiment 3 of the present disclosure, and the present embodiment is another specific embodiment of Embodiment 1, as shown in FIG. 3, the method of location information processing of the present embodiment can include the following steps:

Step 301, when a UE accesses a home network, an HNB sends a UE registration request (UE Registration Req) message to an HNB gateway, where the UE registration request includes identification information of the UE, version information of the UE and capability information of the UE;

wherein, the HNB may operate in an open (Open) mode, or may be in a close (Close) mode.

Step 302, the HNB gateway executes an access control;

Specifically, the HNB gateway can execute the access control according to a rejected admission list stored therein, for example: a UE which is in the rejected admission list is permitted to access to a core network, and the following procedure is executed; and a UE which is not in the rejected admission list is permitted to access the core network.

Step 303, the HNB gateway acquires identification information of the UE and an HNB identification (HNB ID) of the HNB;

Step 304, the HNB gateway sends the identification information of the UE and the HNB identification (HNB ID) of the HNB to a location service gateway of the HNB;

Step 305, the location service gateway of the HNB sends, according to a corresponding relationship between the UE and a service, the identification information of the UE and the HNB identification (HNB ID) of the HNB to a service server of the service corresponding to the UE.

Wherein, the corresponding relationship between the UE and the service can include at least one of the following corresponding relationships: a corresponding relationship between the identification information of the UE and the service; a corresponding relationship between the HNB identification (HNB ID) of the HNB and the service.

Step 306, the service server sends a service message to the UE according to the acquired identification information of the UE and the HNB identification (HNB ID) of the HNB.

It should be noted that, there is no execution order between the above step 302 and steps 303, 304, 305, 306.

In the present embodiment, when a UE accesses a home network, an HNB gateway acquires the identification information of the UE and the HNB identification of the HNB, such that the HNB gateway can send the identification information of the UE and the HNB identification of the HNB to a service server through a location service gateway of the HNB, thus the service server can send a service message to the UE according to the acquired identification information of the UE and the HNB identification of the HNB. The service server in the present embodiment can acquire the location information of the UE without depending on an MSC, and it can avoid the problem that the service server cannot trigger a corresponding service message according to the location information of the UE since the HNB rejects the access of the UEs which are not in an admission list when operating in a close mode, thus improving flexibility and efficiency of a service message transmission.

It should be noted that, for ease of description in the method embodiments above, the method is described as a series of operations, and those skilled in the art are aware that the order of operations described herein shall not be construed as limitation on the present disclosure because certain steps may be performed in a different order or be performed simultaneously according to the present disclosure. Also, it should be understood for those skilled in the art that the embodiments described in the description belong to the preferable embodiments, so the associated operations and modules are not necessary for the present disclosure.

In the foregoing embodiments, each embodiment emphasizes a specific aspect, and the part not detailed in one embodiment may be referred to in another embodiment.

Figure 4:
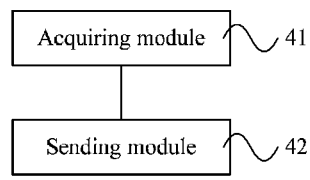
FIG. 4 is a schematic structural diagram of an access network device provided by Embodiment 4 of the present disclosure.

FIG. 4 is a schematic structural diagram of an access network device provided by Embodiment 4 of the present disclosure, as shown in FIG. 4, the access network device of the present embodiment can include an acquiring module 41 and a sending module 42. Wherein, the acquiring module 41 is configured to acquire identification information of a UE and location information of the UE when the UE accesses a home network; and the sending module 42 is configured to send the identification information and the location information of the UE acquired by the acquiring module 41 to a service server, such that the service server sends a service message to the UE according to the identification information and the location information of the UE.

Wherein, the identification information of the UE can include but is not limited to an international mobile subscriber identifier (International Mobile Subscriber Identifier, IMSI) or a closed subscriber group (Closed Subscriber Group, CSG), which the UE belongs to, identification (CSG ID).

Wherein, the location information of the UE can include but is not limited to a cell identifier (CELL ID) of a cell in which the UE is located, a home nodeB identifier (HNB ID) of an HNB which the UE accesses into or geographic information of the HNB which the UE accesses into. Wherein, the geographic information of the HNB can include but is not limited to longitude and latitude information configured by an operator or the UE for each HNB, internet information (Internet Information) of the HNB, such as IP address, media access control (Media Access Control, MAC) address, etc.

Alternatively, the sending module 42 in the present embodiment can specifically send, according to a corresponding relationship between the UE and a service, the identification information and the location information of the UE to the service server of the service corresponding to the UE.

Alternatively, the sending module 42 in the present embodiment can specifically send the identification information and the location information of the UE to a service server of a service corresponding to the UE and acquired time information according to the corresponding relationship between the UE and the service and a corresponding relationship between time information and the service, and the above time information is time information corresponding to time at which the acquiring module 41 acquires the identification information and the location information of the UE.

Alternatively, in the present embodiment, the sending module 42 can specifically further send the identification information and the location information of the UE to the service server through a location service gateway of the HNB.

In the present embodiment, when a UE accesses a home network, an acquiring module acquires the identification information and the location information of the UE, such that a sending module can send the identification information and the location information of the UE acquired by the acquiring module to a service server, thus the service server can send a service message to the UE according to the acquired identification information and the location information of the UE. The service server in the present embodiment can acquire the location information of the UE without depending on an MSC, and it can avoid the problem that the service server cannot trigger a corresponding service message according to the location information of the UE since the HNB rejects the access of the UEs which are not in an admission list when operating in a close mode, thus improving flexibility and efficiency of a service message transmission.

Those of ordinary skill in the art should understand that all or a part of the steps according to the method embodiments of the present disclosure may be implemented through a hardware related to program instructions. The program may be stored in a computer readable storage medium, when the program is executed, the steps of above method embodiments are performed. The storage medium comprises: ROM, RAM, disk, CD or all other medium that can store the program code.

Finally, it should be noted that the above embodiments are merely provided for describing the technical solutions of the present disclosure, but not intended to limit the present disclosure. It should be understood by those of ordinary skill in the art that although the present disclosure has been described in detail with reference to the foregoing embodiments, modifications can be made to the technical solutions described in the foregoing embodiments, or equivalent replacements can be made to some technical features in the technical solutions, as long as such modifications or replacements do not cause the essence of corresponding technical solutions to depart from the spirit and scope of embodiments of the present disclosure.

What is claimed is:

1. A method of processing location information, the method comprising:
   acquiring, by an access network device, identification information and location information of a user equipment (UE) when the UE accesses a home network; and
   sending, by the access network device, the identification information and the location information of the UE to a service server, so that the service server sends a service message to the UE according to the identification information and the location information of the UE;
   wherein the step of sending, by the access network device, the identification information and the location information of the UE to the service server comprises:
   sending, by the access network device, the identification information and the location information of the UE to the service server of a service corresponding to the UE and a time information acquired according to a corresponding relationship between the UE and the service and a corresponding relationship between the time information and the service, wherein the time information is time information corresponding to time at which the access network device acquires the identification information and the location information of the UE.

2. The method according to claim 1, wherein the location information of the UE comprises a cell identification of a cell in which the UE is located or a home NodeB identification of a home NodeB which the UE accesses.

3. The method according to claim 1, wherein the corresponding relationship between the UE and the service comprises at least one of:
   a corresponding relationship between the identification information or the UE and the service; and
   a corresponding relationship between the location information of the UE and the service.

4. The method according to claim 1, wherein the step of sending, by the access network device, the identification information and the location information of the UE to the service server comprises:
   sending, by the access network device, the identification information and the location information of the UE to the service server through a location service gateway of a home NodeB.

5. The method according to claim 4, further comprising:
   sending, by the location service gateway of the home NodeB, the identification information and the location information of the UE to the service server of a service corresponding to the UE and a time information acquired according to a corresponding relationship between the UE and the service and a corresponding relationship between the time information and the service, wherein the time information is time information corresponding to time at which the location service gateway of the home NodeB acquires the identification information and the location information of the UE.

6. The method according to claim 5, wherein the corresponding relationship between the UE and the service comprises at least one of:

a corresponding relationship between the identification information or the UE and the service; and a corresponding relationship between the location information of the UE and the service.

7. The method according to claim 1, wherein the access network device comprises a home NodeB or a home NodeB gateway.

8. An access network device, comprising:

an acquiring module, configured to acquire identification information and location information of a user equipment (UE) when the UE accesses a home network; and a sending module, configured to send the identification information and the location information of the UE to a service server, so that the service server sends a service message to the UE according to the identification information and the location information of the UE;

wherein the sending module sends the identification information and the location information of the UE to the service server of a service corresponding to the UE and a time information acquired according to a corresponding relationship between the UE and the service and a corresponding relationship between the time information and the service, wherein the time information is time information corresponding to time at which the acquiring module acquires the identification information and the location information of the UE.

9. The access network device according to claim 8, wherein the location information comprises a cell identification of a cell in which the UE is located or a home nodeB identification of a home NodeB which the UE accesses.

10. The access network device according to claim 8, wherein the sending module sends the identification information and the location information of the UE to the service server through a location service gateway of a home NodeB.

11. The access network device according to claim 8, wherein the access network device comprises a home NodeB or a home NodeB gateway.

* * * * *